000
United States Patent Office 3,483,245
Patented Dec. 9, 1969

3,483,245
[β-(HALOACETYLTHIO)-ETHYL]-CARBONIC ACID ESTERS
Friedrich Paltauf, Graz, Austria, and Raphael Menasse and Karl Gatzi, Basel, Switzerland, assignors to Geigy Chemical Corporation, Ardsley, N.Y., a corporation of New York
No Drawing. Filed June 26, 1967, Ser. No. 649,028
Claims priority, application Switzerland, July 1, 1966, 9,606/66
Int. Cl. C07c *153/07;* A01n *9/12*
U.S. Cl. 260—455                    7 Claims

ABSTRACT OF THE DISCLOSURE

Fungicidal mixed di-esters of carbonic acid wherein one alcohol moiety is a lower alkyl group and the other is an ethyl group substituted at the carbon atom in β-position by the grouping $$-S-CO-C(H)_n-(Hal)_{3-n}$$

wherein $n$ is 0, 1 or 2 and Hal represents chlorine or bromine; compositions containing these esters as fungicidally active ingredients and a method of controlling fungal growth by application of the esters.

DESCRIPTION OF THE INVENTION

The present invention concerns new carbonic acid mixed di-esters having fungicidal properties, fungicidal compositions which contain these new esters as active substances, process for the production of these new compounds, as well as the use of these active substances and compositions containing them for combatting phytopathogenic fungi.

Carbonic acid esters of the general Formula I

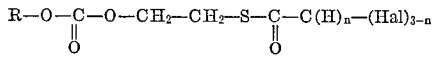

(I)

wherein:

R represents an alkyl radical having from 1 to 4 carbon atoms,
Hal represents chlorine or bromine,
$n$ represents a whole number from 0 to 2, have good fungicidal properties and are suitable, therefore, for combatting phytopathogenic fungi. In practical applications they have no properties which are injurious to plants and they are substantially stable to the effects of the weather.

The new carbonic acid esters of the general Formula I are active against numerous phytopathogenic fungi, particularly against germs from the Erysiphaceae family, causing powdery mildew diseases, e.g. of the genus Sphaerotheca and Erysiphe. Also, germs causing fungal diseases other than powdery mildew can be combatted by the use of the new carbonic acid esters. The new active substances protect plants and parts thereof (blossoms, seeds, fruit, foliage and stems) from attack by fungi and, further, serve for the treatment of seeds without influencing the germination thereof.

The new carbonic acid esters of general Formula I are produced according to the present invention by reacting an ester of the general Formula II

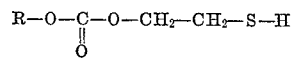

(II)

wherein R has the meaning given above, with an acetyl halide of the general Formula III

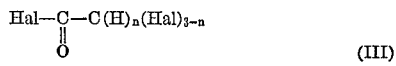

(III)

wherein Hal and $n$ have the meanings given above.

The reaction is optionally performed in the presence of a solvent which is inert to the reaction partners, such as aromatic hydrocarbons, aliphatic and aromatic halogenated hydrocarbons, ethers etc. and optionally in the presence of acid binding agents such as inorganic bases, e.g. alkali metal hydroxides and carbonates, particularly however, organic bases such as tertiary amines.

The following non-limitative example describes the production of the new carbonic acid esters. Where not otherwise stated, parts are given as parts by weight and the temperatures are given in degrees centigrade.

Throughout the specification, percentages of certain ingredients are given by weight calculated on the weight of the total composition containing the respective ingredient.

EXAMPLE 225 parts of 2-mercaptoethyl carbonic acid ethyl ester [produced according to D. D. Reynolds, J. Org. Chem. 26, 5124 (1962)] are dissolved in 750 parts by volume of anhydrous benzene. 124 parts by volume of chloracetyl chloride are added dropwise to this solution within 30 minutes at 10–15°. Finally, 156 parts of anhydrous triethylamine are added dropwise to this solution within 50 minutes. A voluminous precipitate is formed. The reaction mixture is stirred for about 14 hours at room temperature. To work up, the precipitate is filtered off under suction and washed with benzene. The benzene filtrate is then washed, once with 200 parts by volume of water, once with 150 parts by volume of saturated sodium bicarbonate solution and then again with water until the washing water is neutral, dried with calcined sodium sulphate and concentrated in vacuo. The residue is distilled under high vacuum.

The [β - (chloracetylthio)-ethyl]-carbonic acid ethyl ester obtained boils at 104–105.5° under 0.04 mm. Hg.

The following compounds are produced in the manner described in the above example:

[β-(chloracetylthio)-ethyl]-carbonic acid methyl ester, B.P. 83–87°/0.01 mm. Hg.
[β-(chloracetylthio)-ethyl]-carbonic acid isobutyl ester
[β-(dichloracetylthio)-ethyl]-carbonic acid ethyl ester, B.P. 101–104°/0.03 mm. Hg
[β-(trichloracetylthio)-ethyl]-carbonic acid ethyl ester, B.P. 113–115°/0.03 mm. Hg
[β-(bromacetylthio)-ethyl]-carbonic acid ethyl ester, B.P. 124°/0.005 mm. Hg.

The fungicidal action of the new compounds of general Formula I was determined by the so-called "spore germination test" on the following phytopathogenic fungi:

*Alternaria tenuis; Botrytis cinerea; Clasterosporium c.; Coniothyrium dipl.; Fusarium culm.; Rhizopus nigr.; Penicilium spec.; Stemphylium cons.*

1 milliliter of a 1% and 0.1% solution, respectively, of the active substances in acetone is placed on two glass slides (26 x 76 mm.) under the same conditions. The solvent is evaporated off and uniform coatings of active substance are obtained on the glass slides. These slides are then inoculated with spores of the above fungi and then stored in dishes at room temperature in an atmosphere which is almost saturated with steam. The germinated spores are counted for the first time after 2 to 3 days and a second time after 4 to 5 days. The average is determined from the two values obtained. The results are compiled in the following table.

SPORE GERMINATION TEST

| Compound | Alt. ten. | Botr. cin. | Clast. c. | Conioth. dipl. | Fus. culm. | Rhiz. nig. | Pen. spec. | Stemph. cons |
|---|---|---|---|---|---|---|---|---|
| [β-(chloracetylthio)-ethyl]-carbonic acid ethyl ester | + | + | + | + | + | + | + | + |
| [β-(bromacetylthio)-ethyl]-carbonic acid ethyl ester | + | + | ++ | + | + | + | + | + |
| [β-(chloracetylthio)-ethyl]-carbonic acid isobutyl ester | + | + | + | + | + | + | + | + |

+ means an at least 90% inhibition of germination caused by the residue of 1 ml. of the 1% solution of active substance.
++ means the same inhibition caused by the residue of 1 ml. of the 0.1% solution of active substance.

The fungicidal compositions are produced by methods known per se by intimately mixing and milling the active sustances of general Formula I with suitable carriers optionally with the addition of dispersing agents or solvents which are inert to the active substances. These compositions can be in and used in the following forms:

Solid forms: dusts, sprinkling agents, granulates such as coated granules, impregnated granules, homogeneous granules;
Water dispersible concentrates of active substances: wettable powders, pastes, emulsion;
Liquid forms: solutions, aerosols.

To produce the solid forms for use in the field (dusts, sprinkling agents, granulates), the active substances are mixed with solid carriers. Examples of carriers are kaolin, talcum, bole, loess, chalk, limestone, ground limestone, ataclay, dolomite, diatomaceous earth, precipitated silicic acid, alkaline earth silicates, sodium and potassium aluminium silicates (feldspar and mica), calcium and magnesium sulphates, magnesium oxide, milled synthetic plastics, fertilisers such as ammonium sulphate, ammonium phosphates, ammonium nitrate, urea, ground vegetable products such as bran, bark dust, sawdust, ground nutshells, cellulose powder, residues of plant extractions, active charcoal etc. These carriers can be used alone or admixed with each other.

The particle size of the carriers is, for dust advantageously up to about 100μ, for sprinkling agents about 75μ–0.2 mm. and for granulates 0.2 mm. or coarser.

As a rule, the concentrations of active substances in the solid compositions is from 0.5–80%.

To these mixtures can also be added additives which stabilise the active substance and/or commercially available nonionogenic, anionically and cationically active substances which, for example, improve the adhesion of the active substances on plants and parts of plants (glues and adhesives) and/or attain better wettability (wetting agents) and dispersibility (dispersing agents) of the active substances.

The concentrates of active substance which can be dispersed in water, i.e. wettable powders, pastes and emulsion concentrates, are compositions which can be diluted with water to any concentration desired. They consist of active substance, carrier, optionally additives which stabilise the active substance, surface active substances and antifoam agents and, optionally, solvents. The concentration of active substance in these agents is 5–80% by weight calculated on the total weight of the agent.

Wettable powders and pastes are obtained by mixing and milling the active substances with dispersing agents and pulverulent carriers in suitable apparatus, until homogeneity is attained. Carriers are, for example, those mentioned in the paragraph dealing with solid forms for application. In some cases it is advantageous to use mixtures of different carriers. Commercially available surface active substances can be used as dispersing agents.

Silicons, "Antifoam A" etc. are examples of anti-foam agents.

The active substances are so mixed, milled, sieved and strained with the additives mentioned above that, in wettable powders, the solid particle size of 20–40μ and, in pastes, of 3μ is not exceeded. To produce emulsion concentrates and pastes, dispersing agents such as those given in the previous paragraphs, organic solvents and water are used. Examples of solvents are as follows: alcohols, benzene, xylenes, toluene, dimethyl sulphoxide and mineral oil fractions boiling between 120 and 350° C. The solvents must be almost without smell, not phytotoxic, inert to the active substances and not easily inflammable.

In addition, the compositions according to the invention can be applied in the form of solutions. For this purpose the active substance or several active substances of general Formula I are dissolved in suitable organic solvents, mixtures of solvents or in water. Aliphatic and aromatic hydrocarbons, chlorinated derivatives thereof, alkyl naphthalenes alone or mixed with each other can be used as organic solvents. The solutions should contain the active substances in a concentration from 1 to 20%.

The compositions according to the invention described can be mixed with other biocidally active compounds or agents. Thus, to broaden the range of action, the new agents can contain, e.g. insecticides, other fungicides, bactericides, fungistatics, bacteriostatics or nematicides in addition to the compounds mentioned of general Formula I. The compositions according to the invention can also contain fertilisers, trace elements etc.

The following forms for application of the compositions according to the invention serve to illustrate the utility of the present invention; where not otherwise expressly stated, "parts" mean parts by weight.

Wherever percentages are mentioned in this specification they are given by weight unless expressly stated otherwise or nondimensional entities are involved.

Dust

The following components are used to produce a 5% dust:

| | Parts |
|---|---|
| [β-(dichloracetylthio)-ethyl]-carbonic acid ethyl ester | 5 |
| Talcum | 95 |

The active substance mentioned above is intimately mixed and milled with the carrier. The fungicidal dust so obtained serves for the treatment of seed beds or for dusting plants.

Seed dressing

To produce (a) a 10% and (b) a 60% seed dressing are used:

(a)

| | Parts |
|---|---|
| [β-(dichloracetylthio)-ethyl]-carbonic acid ethyl ester | 10 |
| Kieselguhr | 5 |
| Liquid paraffin | 1 |
| Talcum | 84 |

(b)

| | Parts |
|---|---|
| [β-(dichloracetylthio)-ethyl]-carbonic acid ethyl ester | 60 |
| Kieselguhr | 15 |
| Liquid paraffin | 1 |
| Talcum | 24 |

The active substances are intimately mixed with the carriers given and the paraffin as distributing agent in a mixer, and then the mixture is milled. The pulverulent seed dressing obtained serves for the treatment of seeds of all types.

Granulates

The following components are used to produce (a) a 10% and (b) a 5% granulate:

(a)

| | Parts |
|---|---|
| [β-(bromacetylthio)-ethyl]-carbonic acid ethyl ester | 10 |
| Ground limestone (0.4–0.8 mm.) | 81.5 |
| Calcium silicate | 8.5 |

(b)

| | Parts |
|---|---|
| [β-(chloracetylthio)-ethyl]-carbonic acid isopropyl ester | 5 |
| Polyethylene glycol (Carbowax 400) | 1 |
| Epoxylated soya bean oil | 0.25 |
| Calcium silicate | 6.5 |
| Ground limestone (0.4–0.8 mm.) | 87.25 |

To produce the granulate described under (a), the ground limestone is impregnated with the active substance and then mixed with calcium silicate. For (b), the ground limestone is impregnated with polyethylene glycol and soya bean oil and then mixed with a mixture consisting of the active substance mentioned and calcium silicate. These granulates are particularly suitable for disinfection of seed beds.

Wettable powders

The following components are used for the production of (a) a 25% and (b) a 40% wettable powder:

(a)

| | Parts |
|---|---|
| [β-(chloracetylthio)-ethyl]-carbonic acid methyl ester | 25 |
| Oleoyl isoethionate | 3 |
| Sodium salt of lignin sulphonic acid | 7 |
| Kieselguhr, purified | 35 |
| Champagne chalk | 5 |
| Kaolin | 24 |
| Polyvinyl alcohol | 1 |

(b)

| | Parts |
|---|---|
| [β-(chloracetylthio)-ethyl]-carbonic acid isobutyl ester | 40 |
| Oleoyl isoethionate | 3 |
| Sodium salt of lignin sulphonic acid | 7 |
| Light silicic acid | 50 |

The active substances mentioned are mixed and finely milled with the carriers and dispersing agents. A wettable powder having excellent wettability and suspendability is obtained. On diluting such wettable powders with water, suspensions of any concentration of active substance desired are obtained which are suitable for the treatment of cultivated plants.

Emulsion concentrates

The following components are used to produce (a) a 5%, (b) a 10% and (c) a 15% emulsion concentrate:

(a)

| | Parts |
|---|---|
| [β-(chloracetylthio)-ethyl]-carbonic acid ethyl ester | 5 |
| Dimethyl formamide | 40 |
| Petroleum (boiling range 230–270° C.) | 50 |
| Emulsifying combination [1] | 5 |

[1] Consisting of the calcium salt of dodecylbenzene sulphonic acid and nonylphenol polyoxyethylene (e.g. P 140 HFP, produced by Union Chimique Belge, S.A., Brussels).

(b)

| | Parts |
|---|---|
| [β-(chloracetylthio)-ethyl]-carbonic acid methyl ester | 10 |
| Dimethyl formamide | 35 |
| Petroleum (boiling range 230–270° C.) | 50 |
| Emulsifying combination [2] | 5 |

[2] Consisting of a mixture of the calcium salt of dedecylbenzene sulphonic acid and nonylphenol polyoxyethylene (e.g. P 140 HFP, produced by Union Chimique Belge, S.A., Brussels).

(c)

| | Parts |
|---|---|
| [β-(chloracetylthio)-ethyl]-carbonic acid isobutyl ester | 25 |
| Xylene | 10 |
| Emulsifying combination [3] | 5 |

[3] Consisting of the calcium salt of dodecylbenzene sulphonic acid and nonylphenol polyoxyethylene (e.g. P 140 HFP, produced by Union Chimique Belge, S.A., Brussels).

Each active substance is dissolved in dimethyl formamide or xylene and the emulsifying combination is added to this solution. Emulsion concentrates are obtained which can be diluted with water to any concentration desired. Such emulsions are suitable for the treatment of cultivated plants.

We claim:

1. A compound of the formula

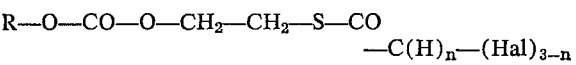

$$R-O-CO-O-CH_2-CH_2-S-CO-C(H)_n-(Hal)_{3-n}$$

wherein:

R represents alkyl of from 1 to 4 carbon atoms,
Hal represents chlorine or bromine, and
$n$ is one of the integers 0, 1 and 2.

2. A compound as defined in claim 1, wherein R is ethyl, $n$ is 2 and Hal is chlorine.
3. A compound as defined in claim 1, wherein R is methyl, $n$ is 2 and Hal is chlorine.
4. A compound as defined in claim 1, wherein R is isobutyl, $n$ is 2 and Hal is chlorine.
5. A compound as defined in claim 1, wherein R is ethyl, $n$ is 1 and Hal is chlorine.
6. A compound as defined in claim 1, wherein R is ethyl, $n$ is 0 and Hal is chlorine.
7. A compound as defined in claim 1, wherein R is ethyl, $n$ is 2 and Hal is bromine.

References Cited

FOREIGN PATENTS 1,134,314  11/1968  Great Britain.

CHARLES B. PARKER, Primary Examiner

D. R. PHILLIPS, Assistant Examiner

U.S. Cl. X.R.

424—301